United States Patent
Tang et al.

(10) Patent No.: US 9,529,722 B1
(45) Date of Patent: Dec. 27, 2016

(54) PREFETCH WITH LOCALITIES AND PERFORMANCE MONITORING

(71) Applicant: SK hynix memory solutions inc., San Jose, CA (US)

(72) Inventors: Xiangyu Tang, San Jose, CA (US); Jason Bellorado, San Jose, CA (US); Lingqi Zeng, San Jose, CA (US); Zheng Wu, San Jose, CA (US); Arunkumar Subramanian, San Jose, CA (US)

(73) Assignee: SK hynix memory solutions Inc., San Jose, CA (US)

( * ) Notice: Subject to any disclaimer, the term of this patent is extended or adjusted under 35 U.S.C. 154(b) by 34 days.

(21) Appl. No.: 14/795,634

(22) Filed: Jul. 9, 2015

Related U.S. Application Data

(60) Provisional application No. 62/031,742, filed on Jul. 31, 2014.

(51) Int. Cl.
   *G06F 12/08*  (2016.01)
   *G06F 3/06*   (2006.01)

(52) U.S. Cl.
   CPC ......... *G06F 12/0862* (2013.01); *G06F 3/0611* (2013.01); *G06F 3/0638* (2013.01); *G06F 3/0679* (2013.01); *G06F 2212/1021* (2013.01); *G06F 2212/222* (2013.01); *G06F 2212/602* (2013.01); *G06F 2212/6022* (2013.01)

(58) Field of Classification Search
   None
   See application file for complete search history.

(56) References Cited

U.S. PATENT DOCUMENTS

| | | | | |
|---|---|---|---|---|
| 6,370,622 | B1 * | 4/2002 | Chiou | G06F 12/0813 711/141 |
| 6,430,653 | B1 * | 8/2002 | Fujikawa | G06F 3/0611 711/113 |
| 6,754,779 | B1 * | 6/2004 | Magro | G06F 12/0862 710/22 |
| 7,711,797 | B1 * | 5/2010 | Huang | H04L 67/2847 709/218 |
| 8,051,249 | B2 | 11/2011 | Mosek et al. | |
| 8,433,852 | B2 | 4/2013 | Hu et al. | |
| 2005/0155084 | A1 | 7/2005 | Chapel et al. | |

(Continued)

FOREIGN PATENT DOCUMENTS

KR  20070093541 A  *  9/2007

OTHER PUBLICATIONS

Byna et al., "Parallel I/O prefetching using MPI file caching and I/O signatures," in High Performance Computing, Networking, Storage and Analysis, 2008. SC 2008. International Conference for , Austin,TX, 2008.

(Continued)

*Primary Examiner* — Kevin Verbrugge
(74) *Attorney, Agent, or Firm* — IP & T Group LLP

(57) ABSTRACT

A locality associated with a read request is identified based at least in part on a read address included in the read request. A predicted read address is generated based at least in part on the locality. It is decided whether to permit the predicted read address to be prefetched; in the event it is decided to permit the predicted read address to be prefetched, data from the predicted read address is prefetched and the prefetched data is stored in a prefetch cache.

20 Claims, 11 Drawing Sheets

(56) References Cited

U.S. PATENT DOCUMENTS

| | | | |
|---|---|---|---|
| 2009/0177842 A1* | 7/2009 | Kulkarni | G06F 9/383 711/125 |
| 2010/0070709 A1* | 3/2010 | Mekhiel | G06F 12/0888 711/122 |
| 2010/0174853 A1 | 7/2010 | Lee et al. | |
| 2015/0193355 A1* | 7/2015 | Hughes | G06F 12/123 711/129 |

OTHER PUBLICATIONS

Chen et al., "Collective Prefetching for Parallel I/O Systems," in Petascale Data Storage Workshop (PDSW), 2010.

Chen et al., "Hiding I/O Latency with Pre-execution Prefetching for Parallel Applications," in The International Conference for High Performance Computing, Networking, Storage, and Analysis, 2008.

Kimbrel et al., "A Trace-Driven Comparison of Algorithms for Parallel Prefetching and Caching," in Proceedings of the 2nd USENIX Symposium on Operating Systems Design and Implementation (OSDI), Seattle, WA, 1996.

Kroeger et al., "Design and Implementation of a Predictive File Prefetching Algorithm," in Proceedings of the 2001 USENIX Annual Technical Conference, Boston, MA, 2001.

Papathanasiou et al., "Aggressive Prefetching: An Idea Whose Time Has Come," in HOTOS'05 Proceedings of the 10th conference on Hot Topics in Operating Systems, Berkeley, CA, 2005.

Patterson et al., "Informed Prefetching and Caching," in Proc. of the 15th ACM Symp. on Operating System Principles, Copper Mountain Resort, CO, 1995.

Vellanki et al., "A Cost-Benefit Scheme for High Performance Predictive Prefetching," in In Proceedings of SC99: High Performance Networking and Computing, 1999.

Min et al., "Design and Implementation of a Log-Structured File System for Flash-Based Solid State Drives", IEEE Transactions on Computers, vol. 1, No. 1, Jan. 2013.

* cited by examiner

У S 9,529,722 B1

PREFETCH WITH LOCALITIES AND PERFORMANCE MONITORING

CROSS REFERENCE TO OTHER APPLICATIONS

This application claims priority to U.S. Provisional Patent Application No. 62/031,742 entitled PREFETCH AND CACHE MANAGEMENT TO IMPROVE STORAGE READ RESPONSE TIME filed Jul. 31, 2014 which is incorporated herein by reference for all purposes.

BACKGROUND OF THE INVENTION

Generally speaking, prefetching is a technique where the system predicts what read address(es) will be requested in the future and reads those predicted read address(es) even though the host or application has not yet asked for those address(es). Although prefetch techniques exist, it would be desirable if better prefetch techniques could be developed (e.g., as measured by hit rate and/or ease of implementation). In particular, solid state storage systems (such as NAND Flash) may have some performance metrics that are not of concern to other types of storage, such as hard disk drive (HDD) storage. It would be desirable if such new prefetch techniques took into account performance metrics or concerns that are of interest to solid state storage.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
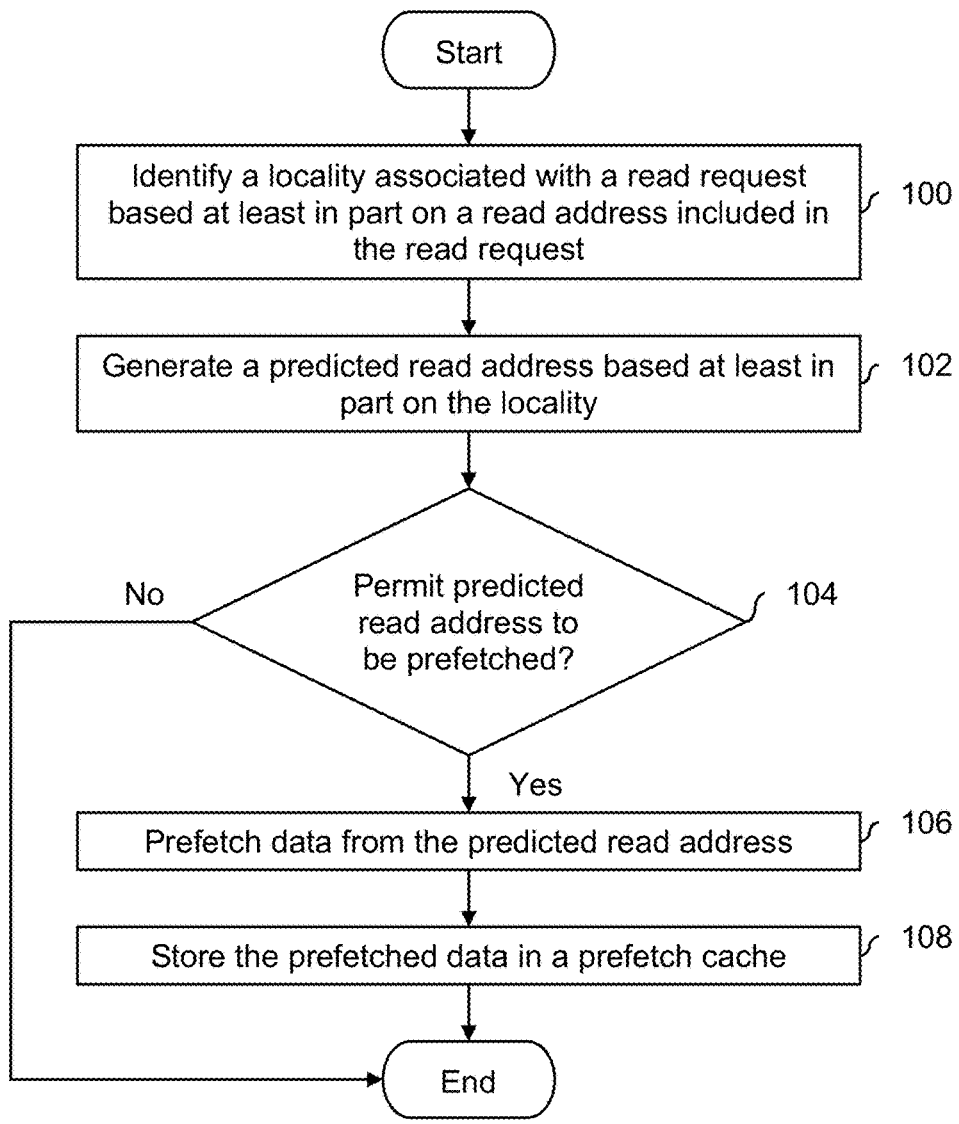
FIG. 1 is a flowchart illustrating an embodiment of a prefetch process that uses localities and performance monitoring.

FIG. 1 is a flowchart illustrating an embodiment of a prefetch process that uses localities and performance monitoring. In some embodiments, the process is performed by a read processor within a solid state storage controller. The read processor may, for example, control read-related operations on one or more associated solid state storage media (e.g., one or more NAND Flash "chips"). In some embodiments, a (e.g., solid state) storage controller which performs the process of FIG. 1 is implemented as a semiconductor device, such as an application-specific integrated circuit (ASIC) or a field-programmable gate array (FPGA). In some embodiments, the process of FIG. 1 is triggered when a read request is received from a host.

At 100, a locality associated with a read request is identified based at least in part on a read address included in the read request. For example, a locality table may be used to store information about known or previously-identified localities. Step 100 may include accessing the information in the locality table and determining if the read request falls into or otherwise matches one of the localities stored in the locality table, or if the read request is associated with a new locality. An example is described in further detail below where the locality table stores a read address for each locality. In that example, if the read address included in the read request is within some predefined distance of a stored read address, the system decides that the read request falls in that locality.

Conceptually, a given locality may be thought of as a group of historic or previously received read addresses that are close to each other (e.g., at the logical level) and thus are believed to correspond to a same access stream or pattern. For example, a host may be issuing read requests to a solid state storage controller for or on behalf of two applications or users which causes two access patterns or streams having different characteristics (e.g., one is sequential while the other is random, one is in the 400-500 address range while the other is in the 800 address range, etc.) to be funneled or otherwise combined together into a single stream that is received by the solid state storage controller.

The solid state storage controller cannot see or observe the individual streams before they were combined, so it does not know how many streams there are, or which read requests (both historic and the one just received) are associated with each stream, but keeps track of localities in an attempt to both determine the number of such streams and the read addresses associated with each stream/locality. Put another way, a locality is a guess as to an access stream or pattern and ideally the number of localities identified at step 100 corresponds to the number of access streams or patterns that the host is combining together.

In some embodiments, a locality table only includes recent information (e.g., recent read requests). To put it another way, localities are identified or otherwise determined using a sliding window where old information is forgotten and new information takes its place. For example, only the last N read requests are used to identify localities. Or, if the read requests are time stamped, then whatever read requests are received over some window of time are used.

At 102, a predicted read address is generated based at least in part on the locality. For example, the locality identified at step 100 may be passed to some read address predictor. The read address predictor takes the locality as input and outputs a predicted read address. In some embodiments, other information is used to generate the predicted read address. In some embodiments, a predicted length is also output (e.g., so that a "chunk" of data beginning at the predicted read address and having a length specified by the predicted length is prefetched, if permitted).

At 104, it is decided whether to permit the predicted read address to be prefetched. Generally speaking, a performance monitor uses one or more metrics to decide whether to let a predicted read address be prefetched. In some embodiments, the decision is based on current system conditions that are global and are not specific to a particular locality (e.g., whether the storage controller is already very busy with host access requests and thus should not perform a prefetch which would slow down those host access requests). In some embodiments, the decision is based on locality-specific information, such as the past performance of that particular locality. For example, one locality may be producing good predictions while another locality is generating poor predicts. Some examples of metrics used by a performance monitor are described in further detail below.

If it is decided at step 104 to permit the prefetch, data is prefetched from the predicted read address at 106. For example, the data may be prefetched from one or more solid state storage devices or "chips."

At 108, the prefetched data is stored in a prefetch cache. In some embodiments, a prefetch cache is divided up such that the first and second localities have dedicated portions. An example of this is described in more detail below.

One benefit to the process of FIG. 1 is that predicted read addresses which are believed to be good (e.g., because they are associated with localities which have been historically good predictors) are permitted to be prefetched, whereas predicted read addresses which are believed to be not as good (e.g., because they are associated with localities which have been historically poor predictors) are not permitted to be prefetched. In contrast, a system which does not use localities and does not use performance monitoring may not perform as well. For example, if most of the traffic is associated with a random access pattern (for which prediction tends to be poor), then other systems which fail to use localities and fail to use performance monitoring would simply let all predicted read addresses be prefetched, which would result in a low cache hit rate (since most of the prefetched data would not be accurate predictions).

Another benefit to this technique is that it reduces read amplification, which is related to the number of extra read a system does and is a system performance metric of concern to solid state storage systems because of read disturb. In solid state storage systems, reads to the solid state storage media introduce noise to word line(s) that are adjacent to the word line being read; this is referred to as read disturb. A higher read amplification value contributes more read disturb to the system. Thus, a higher read amplification value while not getting much benefit from the prefetching is undesirable. Read disturb noise is not an issue with other types of storage systems (such as hard disk drive systems), so for other types of storage systems, this may not be an issue, but for solid state storage systems, extra reads that are not helpful are undesirable.

Another benefit to the process of FIG. 1 is that in some embodiments, the process takes into account current system conditions so that prefetching does not interfere with host access. For example, as will be described in more detail below, the decision at steps 104 may use a utilization metric which represents a degree or amount which the host is (currently) accessing the storage. For example, if the metric is high, then there are currently a lot of host access requests. If the metric is low, then the host is not currently issuing a lot of host access requests. This enables the process of FIG. 1 (in some embodiments at least) to not let a predicted read address be prefetched when there are a lot of host requests (e.g., even if the prefetch read addresses are associated with a locality that has had good predictions in the past). In contrast, some other systems may let all predicted read addresses be prefetched even if the system had a lot of host access requests at that time.

The following figure shows an example of localities and previous read addresses that are associated with and/or included in each locality. The previous read addresses in each locality may affect certain parameters or values associated with each locality (e.g., a read address, a maximum length, a sequence number, a read state, and/or the time of a last state change).

Figure 2:
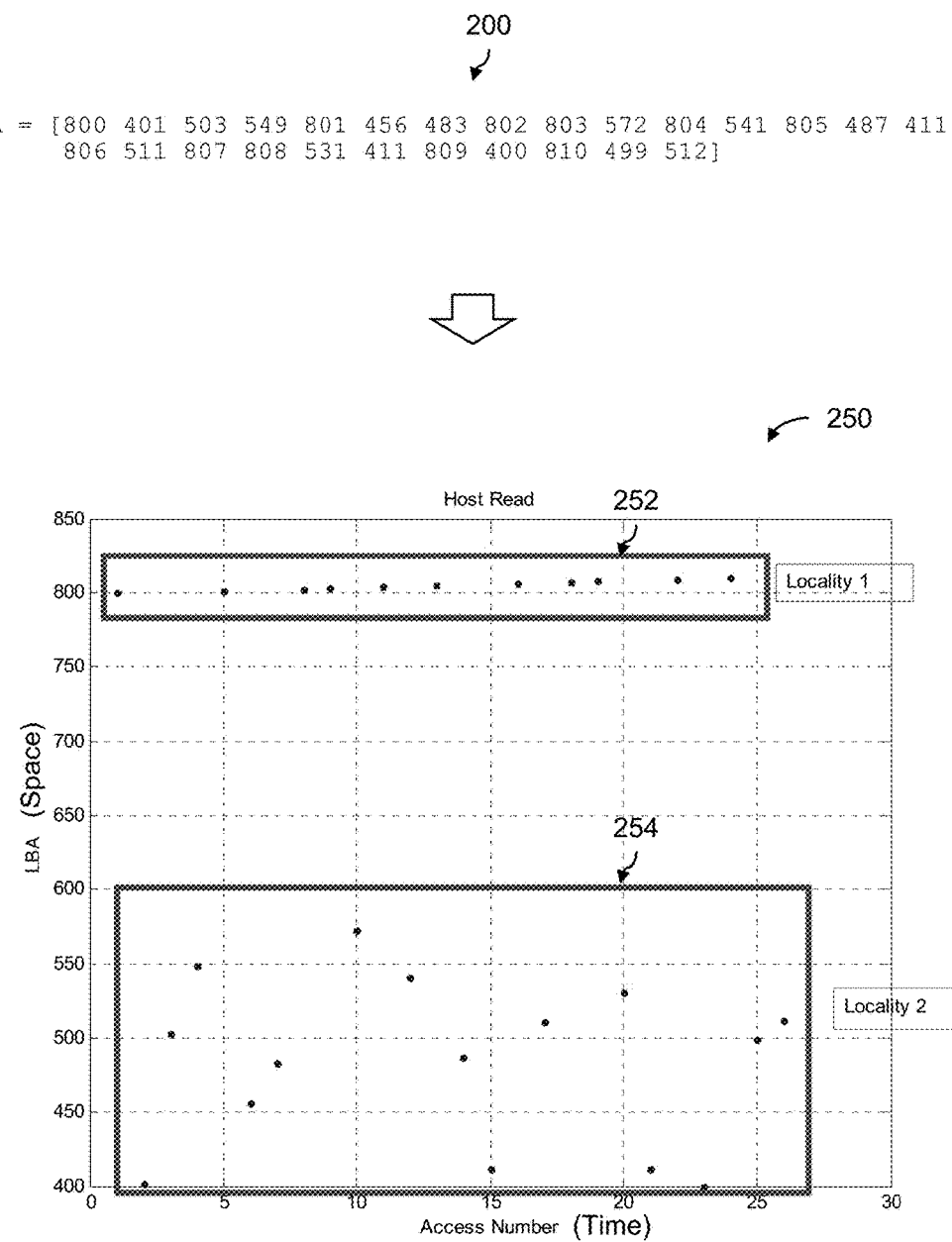
FIG. 2 is a diagram illustrating an embodiment of two localities as associated logical block addresses.

FIG. 2 is a diagram illustrating an embodiment of two localities as associated logical block addresses. In the example shown, sequence 200 shows the 26 logical block addresses that were most recently requested by the host, in the order in which they were received. Logical block addresses are an example of read addresses that are included in a read request from a host.

Graph 250 shows the logical block addresses from sequence 200 plotted. The x-axis of graph 250 corresponds to access number (or conceptually, time) and the y-axis corresponds to the logical block address (or conceptually, space). In this example (which is straightforward in order to clearly illustrate the technique), there are two apparent groups or localities: locality 1 (252) and locality 2 (254).

In this example, locality 1 (252) is associated with a sequential read and in some embodiments a locality tracker identifies locality 1 (252) as being in a sequential read state based on the logical block addresses therein. Note, for example, that the logical block addresses in the 800-range appear in ascending order: 800, 801, 802, etc.

In contrast, locality 2 (254) is associated with a random access or random read pattern. Note, for example, that the variation in logical block addresses associated with locality 2 (254) is relatively large with a seemingly random pattern. In some embodiments, a locality tracker determines that locality 2 (254) is in a random read state.

Naturally, performing locality tracking on a continuous or periodic basis may result in a fluctuating number of localities identified at step 100. In some embodiments, there is some maximum number of localities supported by the system (e.g., set using some register or other configuration setting).

As described above, newer information replaces older information so that older read requests are no longer used to identify localities and/or determine locality values or parameters. For example, if a new logical block address is received, then the oldest logical block address may be discarded and the information associated with that read request is no longer used.

A more detailed example of locality tracking is described in further detail below. Any appropriate technique for grouping logical block addresses together or otherwise identifying which locality a recently received read request belongs to may be used.

The following figure shows an example of a system which performs the process of FIG. 1.

Figure 3:
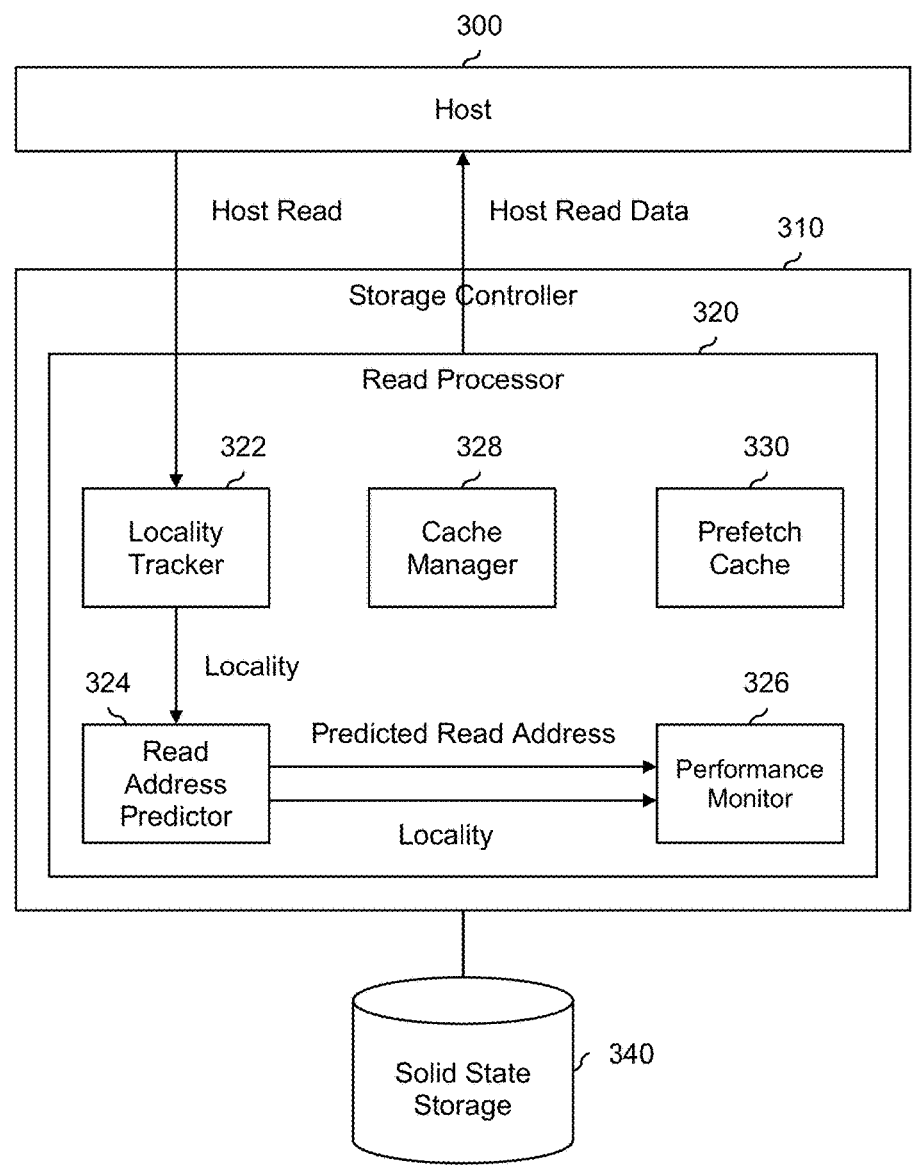
FIG. 3 is a diagram showing an embodiment of a system which prefetches data using localities and performance monitoring.

FIG. 3 is a diagram showing an embodiment of a system which prefetches data using localities and performance monitoring. In the example shown, host 300 issues host reads to (solid state) storage controller 310. In some embodiments, storage controller 310 is a semiconductor device. Storage controller 310 includes read processor 320, which is responsible for read-related operations and processing. To preserve readability, a corresponding write processor is not shown in this example.

A host read is sent from host 300 to read processor 320 and in some embodiments includes a read address (such as a logical block address), a length to read (e.g., beginning from the read address), and a sequence number. The host read is satisfied or otherwise fulfilled in one of two ways. If the data associated with the requested read address is contained in prefetch cache 330 (e.g., because it has been prefetched by read processor 320), then the prefetched data in prefetch cache 330 is returned to the host as host read data. This is sometimes referred to as a cache hit. Returning prefetched data from prefetch cache 330 is much faster than going to solid state storage 340 for the host read data and thus read performance is improved when there is a cache hit.

If the data associated with the requested read address is not in prefetch cache 330, then the data is obtained from solid state storage 340 and is returned as host read data. This is sometimes referred to as a cache miss.

In the background, prefetch cache 330 is updated with prefetched data according to the process of FIG. 1. Locality tracker 322 is one example of a component that performs step 100 in FIG. 1. Locality tracker 322 lets the other components in read processor 320 know how many localities there are and any associated parameters or values associated with each locality (some examples are described in more detail below).

Read address predictor 324 predicts read addresses and is one example of a component that performs step 102 in FIG. 1. In one example, as each host read comes in, for those host reads which are cache misses, locality tracker 322 determines which locality the requested read address is associated with (e.g., locality 1, locality 2, etc.). Locality tracker 322 informs read address predictor 324 of the locality and read address predictor 324 predicts a read address for that locality. In some embodiments, locality tracker 322 also outputs a (historic) maximum requested length for that locality, and read address predictor 324 uses that maximum requested length to determine a range of predicted read addresses (i.e., how large of a "chunk" to suggest for prefetching). In some embodiments, read address predictor 324 uses information associated with the host read (e.g., the requested read address and/or the requested length) in predicting a read address and/or length.

Performance monitor 326 uses one or more metrics to determine whether or not to let a predicted read address from read address predictor 324 be prefetched; it is one example of a component which performs step 104 in FIG. 1.

Cache manager 328 is responsible for managing prefetch cache 330, including by selecting what prefetched data to evict when prefetch cache 330 is full. In some embodiments, cache manager 328 evicts the oldest prefetched data. In some embodiments, prefetch cache 330 is divided up where each locality has dedicated or corresponding cache space. In such embodiments, the evicted data is selected from the portion which corresponds to the locality in question. To put it another way, prefetched data for one locality would not be evicted to make room for prefetched data for another locality (in embodiments as described above at least). An example of this is described in more detail below. Obviously, in such embodiments, if the number of identified caches was to change, the number of portions that prefetch cache 330 is divided up into correspondingly changes. Prefetch cache 330 may be used to store prefetched data and is one example of a component which performs the step of storing in step 108 in FIG. 1.

In some embodiments, storage controller 310 includes a storage interface (not shown) which reads data from and writes data to solid state storage 340. Such a storage interface is one example of a component which performs step 106 in FIG. 1.

In some embodiments, signals and/or information not shown in this figure is exchanged between components. For example, locality tracker 322 may track what kind of read state each locality is in (e.g., sequential, stride, or random) and/or read address predictor 324 may also generate a predicted length (e.g., beginning from the predicted read address) to prefetch (if approved by performance monitor 326).

The following figures illustrate some metrics used by a performance monitor in various embodiments to decide whether to permit a predicted read address to be prefetched (e.g., at step 104 in FIG. 1).

Figure 4A:
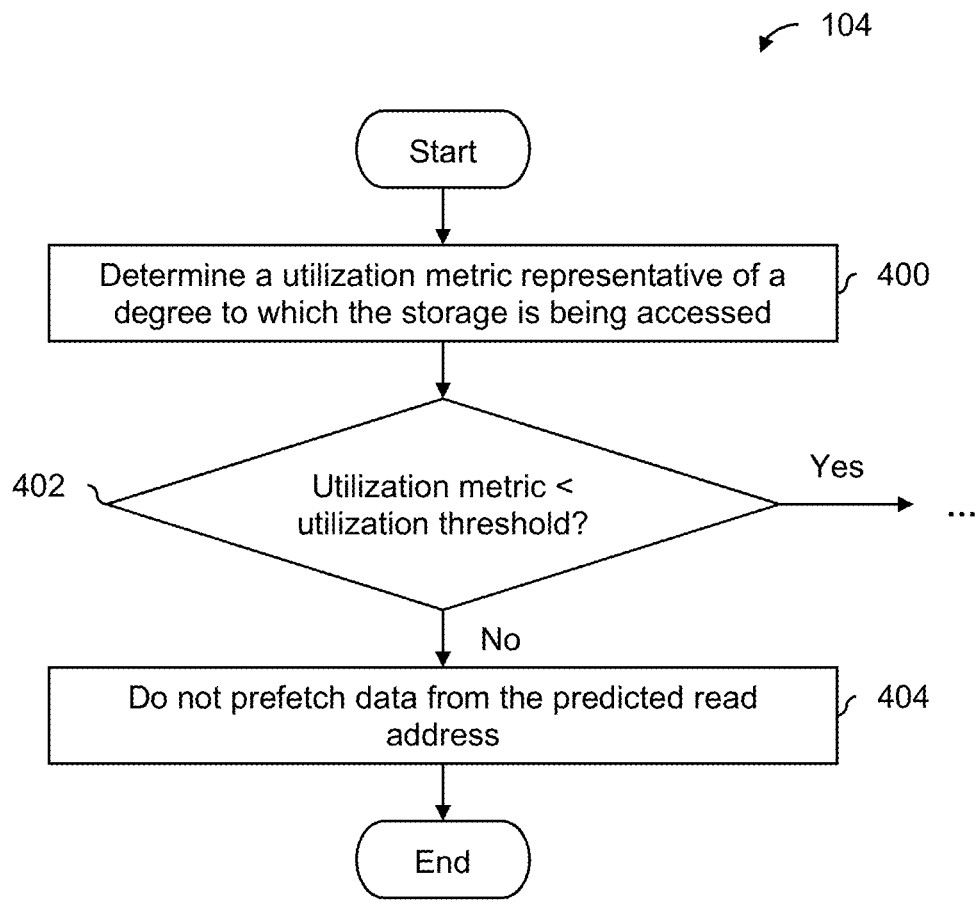
FIG. 4A is a flowchart illustrating an embodiment of a process for deciding whether to permit a predicted read address to be prefetched using a utilization metric.

FIG. 4A is a flowchart illustrating an embodiment of a process for deciding whether to permit a predicted read address to be prefetched using a utilization metric. In the example shown, a utilization metric, representative of a degree to which the storage is being accessed, is determined at 400. In various embodiments, the utilization metric may be determined based on timing and/or traffic information, such as the arrival time or rate of host access requests (e.g., the number of host requests that have arrived in the last X amount of time) and/or the level of congestion in a write buffer (e.g., indicating that a lot of write requests have arrived and the system is backed up trying to process the write requests). For example, the two may be combined using a linear function:

Utilization Metric=$\alpha$<# of host access requests received in last $X$ amount of time>+$\beta$<length of write buffer> where $\alpha$ and $\beta$ are scaling factors.

Other values which may be used at 400 include buffer congestion, host read bandwidth (e.g., the bandwidth between the host and a storage controller), solid state storage bandwidth (e.g., the bandwidth between a storage controller and one or more solid state storage "chips"), host request arrival time, and host request arrival rate.

At 402, it is determined if the utilization metric is less than a utilization threshold. In this example, a larger utilization metric indicates a busier host and so if the utilization metric is greater than or equal to the utilization threshold, then data from the predicted read address is not prefetched at step 404.

In some embodiments, a Yes decision at step 402 is a sufficient condition for the data from the first (second) predicted read address to be prefetched, but in some other embodiments, it is not sufficient in and of itself. As such, the Yes branch out of step 402 is not shown in detail here.

It is noted that the utilization metric will be the same for all localities and thus predicted read addresses from all localities may be prevented from being prefetched when the system is busy responding to host access requests. Some other metrics (including hit rate metrics and read amplification metrics, which are described in further detail below) have different values for different localities and those metrics may result in different decisions for different localities.

Figure 4B:
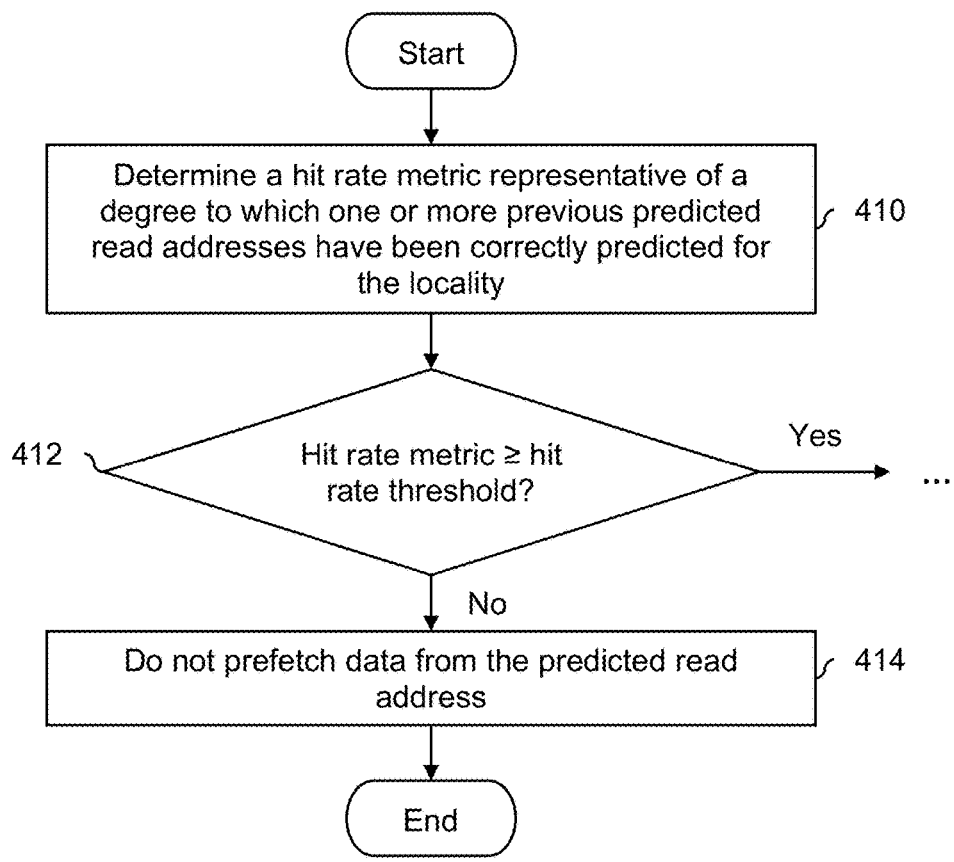
FIG. 4B is a flowchart illustrating an embodiment of a process for deciding whether to permit a predicted read address to be prefetched using a hit rate metric.

FIG. 4B is a flowchart illustrating an embodiment of a process for deciding whether to permit a predicted read address to be prefetched using a hit rate metric. At 410, a hit rate metric representative of a degree to which one or more previous predicted read addresses have been correctly predicted for the locality is determined. For example, the hit rate may be calculated as:

$$\text{Hit Rate Metric} = \frac{\text{Number of Host Reads in Prefetch Cache}}{\text{Number of Host Reads}}$$

over some period of time or number of previous host reads. The hit rate metric is a real number between 0 and 1 where a higher hit rate metric indicates more accurate read predictions. For example, if all host reads have been perfectly predicted, then all of the host reads would be found in the prefetch cache (e.g., prefetch cache 330 in FIG. 3) and thus the hit rate metric would be 1 (i.e., 100%). With a poor predictor, the value of the hit rate metric would be 0.

It is determined at 412 if the hit rate metric is greater than or equal to a hit rate threshold. In one example, the hit rate threshold is set to 0.3. If the hit rate metric is less than the hit rate threshold at step 412, then data from the predicted read address is not prefetched at 414. As described above, a Yes at decision 412 may or may not be sufficient to permit the predicted read address to be prefetched and thus the Yes branch out of step 412 is not shown in detail here.

It is noted that the hit rate metric will be different for each locality, and thus the decision about whether to prefetch a predicted read address or not may be different for different localities.

Figure 4C:
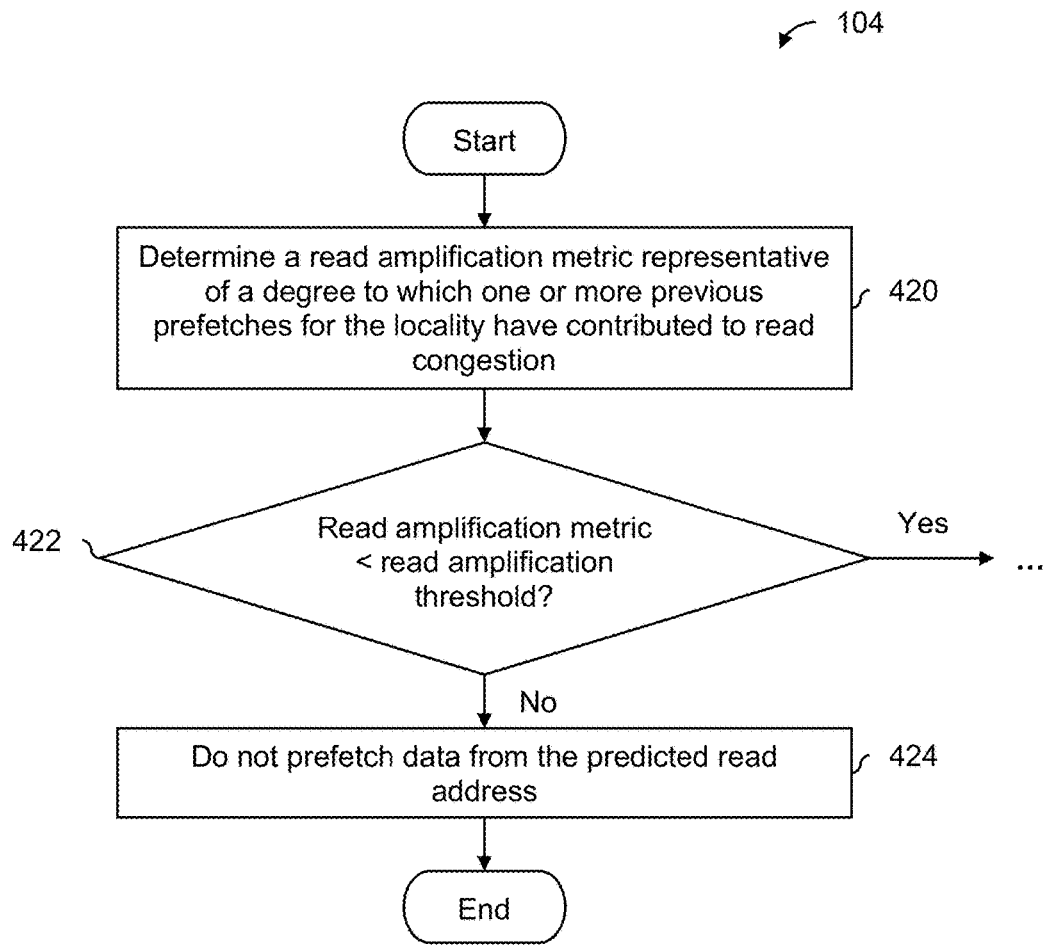
FIG. 4C is a flowchart illustrating an embodiment of a process for deciding whether to permit a predicted read address to be prefetched using a read amplification metric.

FIG. 4C is a flowchart illustrating an embodiment of a process for deciding whether to permit a predicted read address to be prefetched using a read amplification metric. At 420, a read amplification metric representative of a degree to which one or more previous prefetches for the locality have contributed to read congestion is determined. As described above, in solid state storage systems, reading causes noise (sometimes referred to as read disturb noise) to be added to neighbors or adjacent locations to the address being read and as such a read amplification metric is of interest in a solid state storage system. In some embodiments, a read amplification metric is calculated using:

$$\text{Read Amplification Metric} = \frac{\text{Number of Times Solid State Storage is Read}}{\text{Number of Host Reads}}$$

where the read amplification metric is a real number greater than 1. The number of times the solid state storage is read (i.e., the numerator in the above equation) includes the number of host reads (i.e., the denominator in the above equation); the difference between the two equals the number of (additional) reads added or otherwise introduced by the storage controller (e.g., for prefetching and/or other management-related processes). With perfect prediction, the read amplification metric will have a value of 1. With poor prediction, the read amplification metric will have a very large value.

In some cases, one or both of the values from the above equation are not available to a storage controller and in some such embodiments the following estimate is used instead:

$$\text{Read Amplification Metric} = 1 + (1 - \text{Hit Rate Metric}).$$

The above estimation may be obtained by noting or otherwise assuming that every read request will result in a prefetch. If all prefetches are completely accurate, the read amplification metric will equal 1. Any misses (i.e., 1 minus the hit rate metric) will result in additional reads and should be added to the read amplification metric.

At 422, it is determined if the read amplification metric is less than a read amplification threshold. In one example, the read amplification threshold is set to 5. If not, data from the predicted read address is not prefetched at 424. As described above, a Yes decision at 422 may or may not be sufficient to prefetch the data at the predicted read address.

As described above, the read amplification metric will be different for each locality, and thus the decision about whether to prefetch a predicted read address or not may be different for different localities.

The following figure describes an example in which a utilization metric, a hit rate metric, and a read amplification metric are all used to decide whether or not to prefetch data at a predicted read address.

Figure 4D:
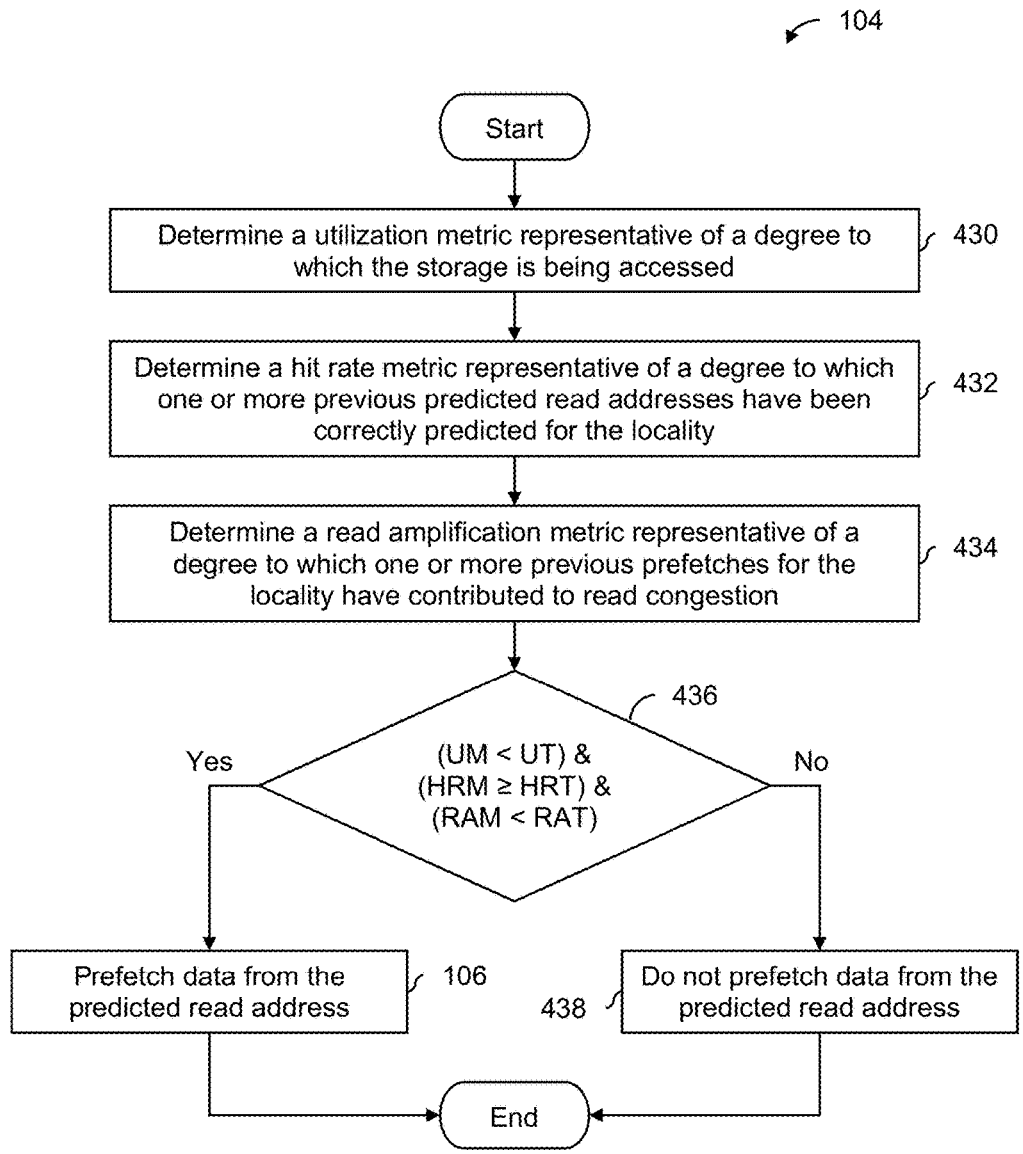
FIG. 4D is a flowchart illustrating an embodiment of a process for deciding whether to permit a predicted read address to be prefetched using a utilization metric, a hit rate metric, and a read amplification metric.

FIG. 4D is a flowchart illustrating an embodiment of a process for deciding whether to permit a predicted read address to be prefetched using a utilization metric, a hit rate metric, and a read amplification metric.

In the example shown, a utilization metric representative of a degree to which the storage is being accessed is determined at 430. At 432, a hit rate metric representative of a degree to which one or more previous predicted read addresses have been correctly predicted for the locality is determined. At 434, a read amplification metric representative of a degree to which one or more previous prefetches for the locality have contributed to read congestion is determined. Some examples of steps 430, 432, and 434 have been described above. Note that there may be a single (e.g., global) utilization metric and different hit rate metrics and different read amplification metrics depending upon the locality.

At 436, it is determined if the utilization metric is less than a utilization threshold, if the hit rate metric is greater than or equal to a hit rate threshold, and if the read amplification metric is less than a read amplification threshold. If so, data from the predicted read address is prefetched at step 106 (for clarity, the same numbering from FIG. 1 is used to show corresponding steps). If not, data from the predicted read address is not prefetched at 438.

In one example, a utilization rate is not used but a hit rate metric and a read amplification metric are used by a simulated performance monitor. With a hit rate threshold of 0.3 and a read amplification threshold of 5, the following hit rates and read amplifications were achieved with random reads.

TABLE 1

Performance of Random Reads

|  | Read Amplification |
| --- | --- |
| Using a hit rate metric and a read amplification metric | 1.000 |
| Another technique | 2.1184 |

Note that the read amplification is roughly half the read amplification of the other technique. This is because the performance monitor correctly predicts that the predicted read addresses are of poor quality and thus should not be prefetched.

The following table shows the same configuration, but with the PCM Vantage benchmark test (with a somewhat predictable read pattern) concatenated before and after with random read traffic. For example, this might be representative of a scenario where multiple benchmarks are being tested on a solid state storage system in succession.

TABLE 2

Performance of PCM Vantage Benchmark and Random Reads

|  | Read Amplification |
| --- | --- |
| Using a hit rate metric and a read amplification metric | 1.0658 |
| Another technique | 1.8538 |

Again, the read amplification has been reduced. The following table shows the same configuration, but with just the PCM Vantage benchmark test.

TABLE 3

Performance of PCM Vantage Benchmark

|  | Read Amplification |
| --- | --- |
| Using a hit rate metric and a read amplification metric | 1.59 |
| Another technique | 1.69 |

In all three cases described above, the read amplification is reduced, which is an important consideration in solid state storage systems.

During the PCM Vantage benchmark, the predicted read addresses will be more accurate and the performance monitor will let more through accordingly. During the random reads, the accuracy of the predictions will drop and the performance monitor will let fewer predicted read addresses be prefetched in response.

Returning to FIG. 3, in some embodiments, prefetch cache 330 is divided up and each locality has a corresponding section or portion of prefetch cache 330. The following figure shows an example of this and describes some benefits.

Figure 5:
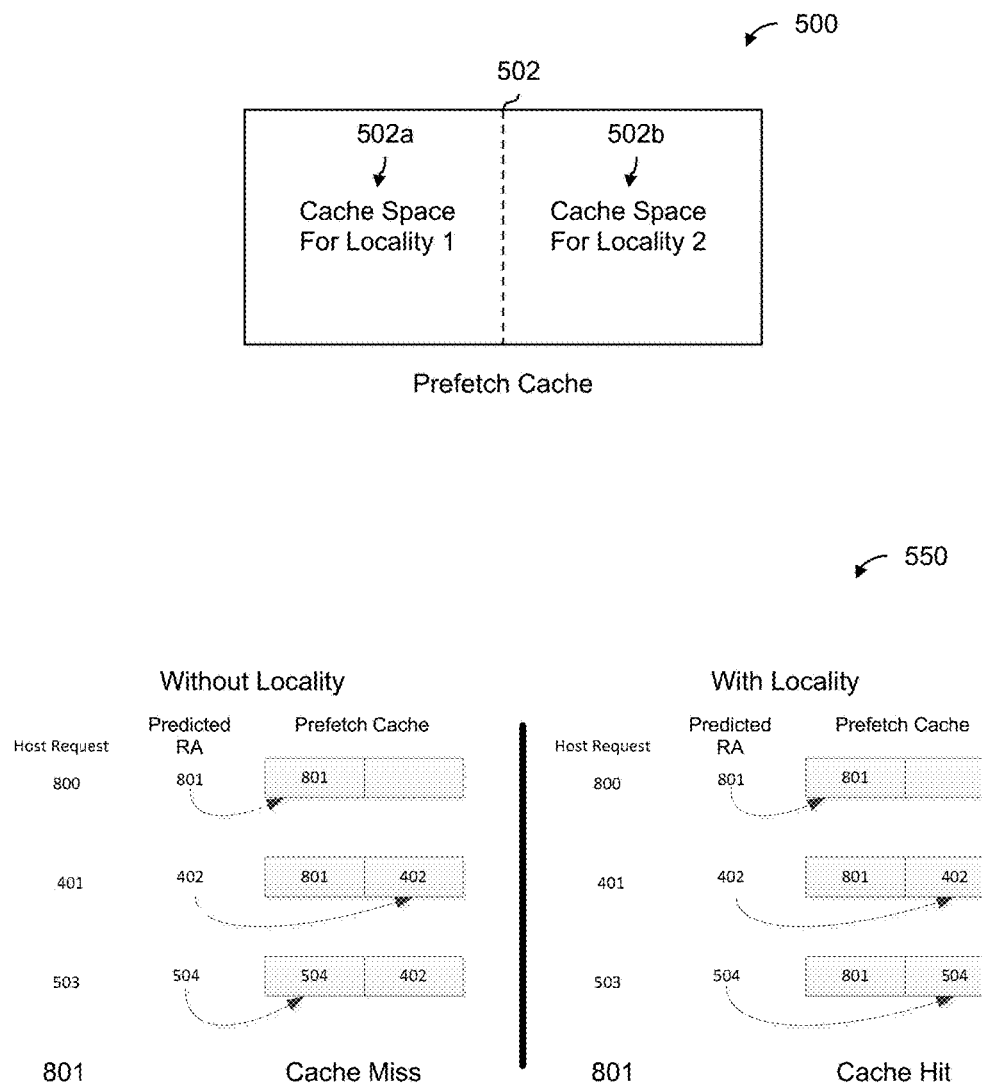
FIG. 5 is a diagram illustrating an embodiment of a prefetch cache that is divided up so that each locality has a corresponding portion of the prefetch cache.

FIG. 5 is a diagram illustrating an embodiment of a prefetch cache that is divided up so that each locality has a corresponding portion of the prefetch cache. In diagram 500, prefetch cache 502 is divided up so that portion 502a is the cache space for a first locality and portion 502b is the cache space for a second locality. In this example, it is assumed that there are two localities. As described above, the number of localities may change over time. Correspondingly, the number of portions a prefetch cache is divided up into will change as the number of localities changes. In some embodiments, cache manager 328 is responsible for tracking where the "dividers" are within prefetch cache 330, the number of localities (e.g., detected by locality tracker 322), and updating the number and positions of "dividers" within prefetch cache 330 if the number of localities changes.

Diagram 550 shows an example of cache eviction with a prefetch cache not divided up (Without Locality in diagram 550) and a prefetch cache divided up so that each locality has a corresponding portion (With Locality in diagram 550). The Host Request column shows the read addresses that are included in read requests from the host: 800, 401, 503, and 801. This example assumes the localities shown in FIG. 2, and thus the received read addresses are associated with a first locality, a second locality, a second locality, and a first locality, respectively.

Each read request causes a different predicted read address to be generated corresponding to the locality for which a host request was received. Note that the same predicted read addresses are generated with locality and without locality. Note, for example, that both scenarios have predicted read addresses of 801, 402, and 504. However, the cache eviction is slightly different. Without locality, the third predicted read address (i.e., 504) causes the data associated with predicted read address 801 to be evicted since that is the oldest piece of data. As a result, a cache miss occurs when the host requests a read address of 801. However, with locality, a prefetched piece of data can only evict another piece of prefetched data from the same locality. As such, the third predicted read address (i.e., 504) causes the data associated with predicted read address 402 to be evicted. This results in a cache hit when the host requests read address 801. Note that the only difference between the with locality scenario and the without locality scenario is the way the prefetch cache is managed. The locality tracking, read address prediction, and performance monitoring are the same.

In some embodiments, the size of each portion depends upon the maximum length associated with each locality. For example, as described above, a locality table in some embodiments stores the maximum length requested for each locality. In some embodiments (when space permits), the size of portion 502a is set to the maximum length stored for the first locality and the size of portion 502b is set to the maximum length stored for the second locality. If space does not permit, then the space may be divided proportionally:

$$\left( \frac{\text{Maximum Length of Locality 1}}{\text{Maximum Length of Locality 1} + \text{Maximum Length of Locality 2}} \right) \times \text{Total Size of Prefetch Cache}$$

and $$\left( \frac{\text{Maximum Length of Locality 2}}{\text{Maximum Length of Locality 1} + \text{Maximum Length of Locality 2}} \right) \times \text{Total Size of Prefetch Cache}.$$

In some embodiments, the maximum number of localities (and thus, the maximum number of portions a prefetch cache would be split into) is determined by simulating benchmark tests used by systems manufacturers to evaluate parts suppliers. In some embodiments, the maximum number of localities is selected to be one that offers a good compromise (e.g., as measured by a hit rate metric or a read amplification metric) across all benchmarks.

Figure 6:
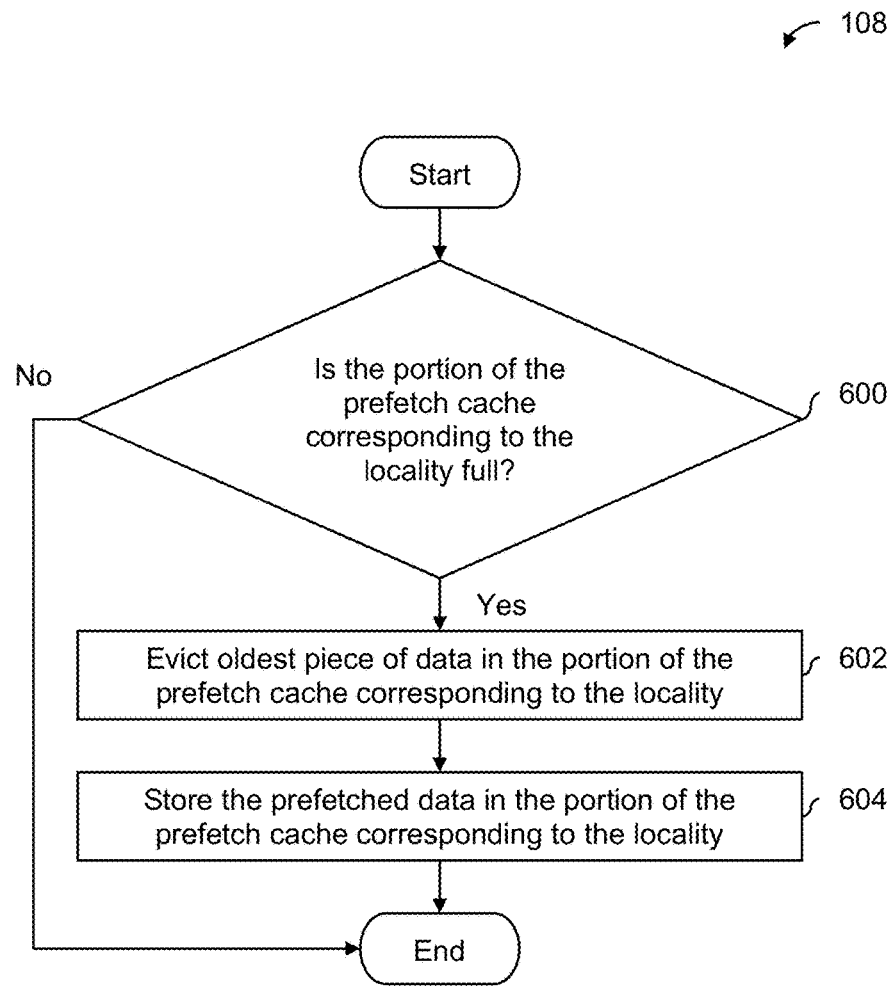
FIG. 6 is a flowchart illustrating an embodiment of a cache eviction process when a prefetch cache is divided up so that each locality has a corresponding portion of the prefetch cache.

FIG. 6 is a flowchart illustrating an embodiment of a cache eviction process when a prefetch cache is divided up so that each locality has a corresponding portion of the prefetch cache. In some embodiments, the process is performed by cache manager 328 in FIG. 3. In some embodiments, the process is performed as part of step 108 in FIG. 1.

At 600, it is determined if the portion of the prefetch cache corresponding to the locality is full. For example, when a piece of prefetched data is received by a cache manager for storage, the associated locality may also be received with it (e.g., so that the cache manager knows which portion of the prefetch cache that the piece of prefetched data should be stored in).

If the portion of interest is determined to be full at step 600, the oldest piece of data in the portion of the prefetch cache corresponding to the locality is evicted at 602. For example, each entry in the prefetch cache may have a sequence number (e.g., which is updated each time a host read request is received which falls into that particular portion/locality), where a higher sequence number indicates a more recent read of the storage. In some embodiments, the piece of data with the lowest sequence number is evicted from the relevant portion of the prefetch cache.

At 604, the prefetched data is stored in the portion of the prefetch cache corresponding to the locality. As described above, with this technique, prefetched data can only evict prefetched data from the same locality. Prefetched data associated with a first locality cannot, for example, cause prefetched data associated with a second locality to be evicted.

The following figures show an example of a locality tracking process. For example, such a process may be performed when a read request is received from a host and the process updates the stored information in a locality table. In various scenarios, a new locality (entry) in a locality table may be created, an old locality (entry) may be deleted from the locality table to make space for a new locality (entry), or an existing locality (entry) may be updated with new information.

Figure 7A:
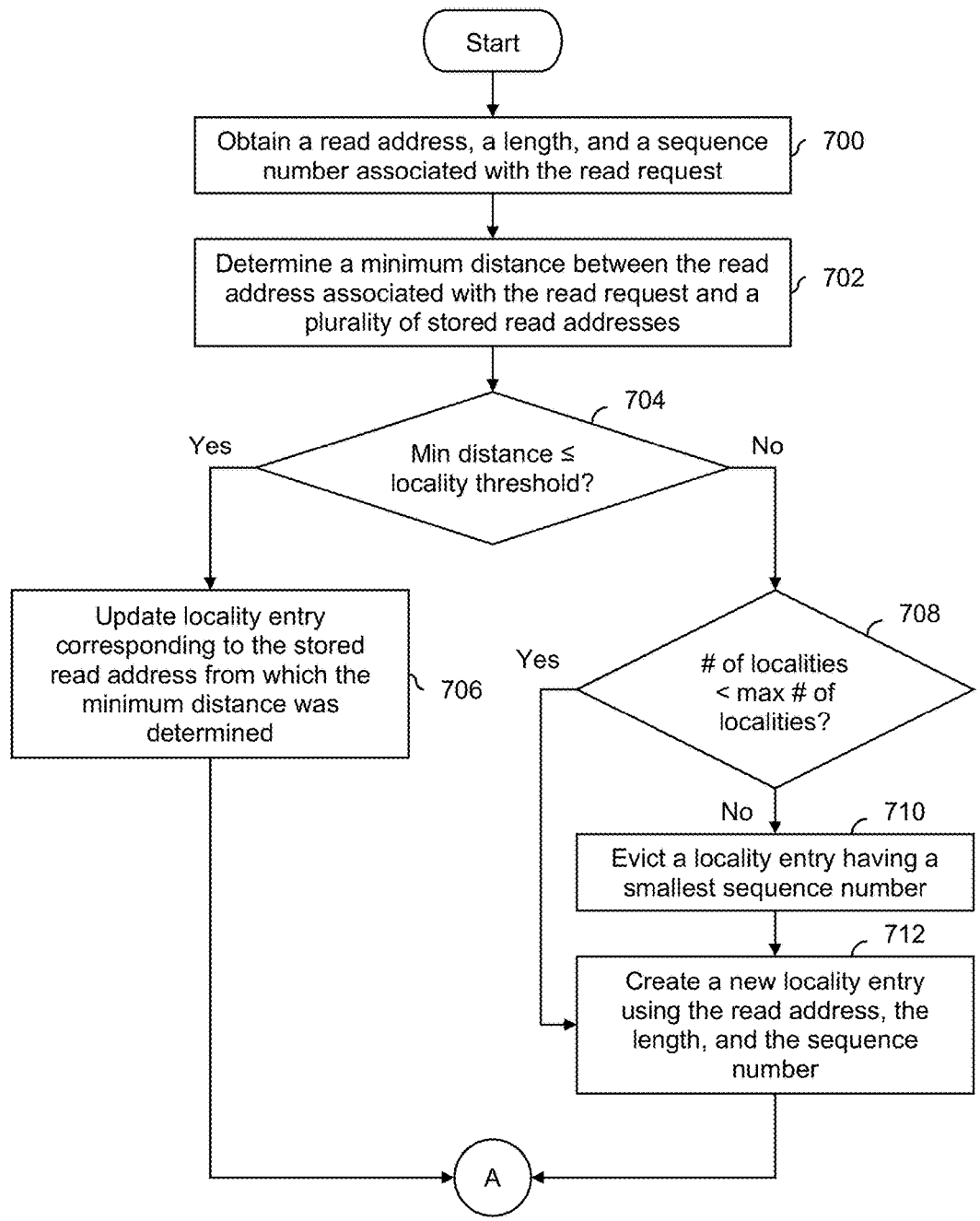
FIGS. 7A and 7B are a flowchart illustrating an embodiment of a locality tracking process.
Figure 7B:
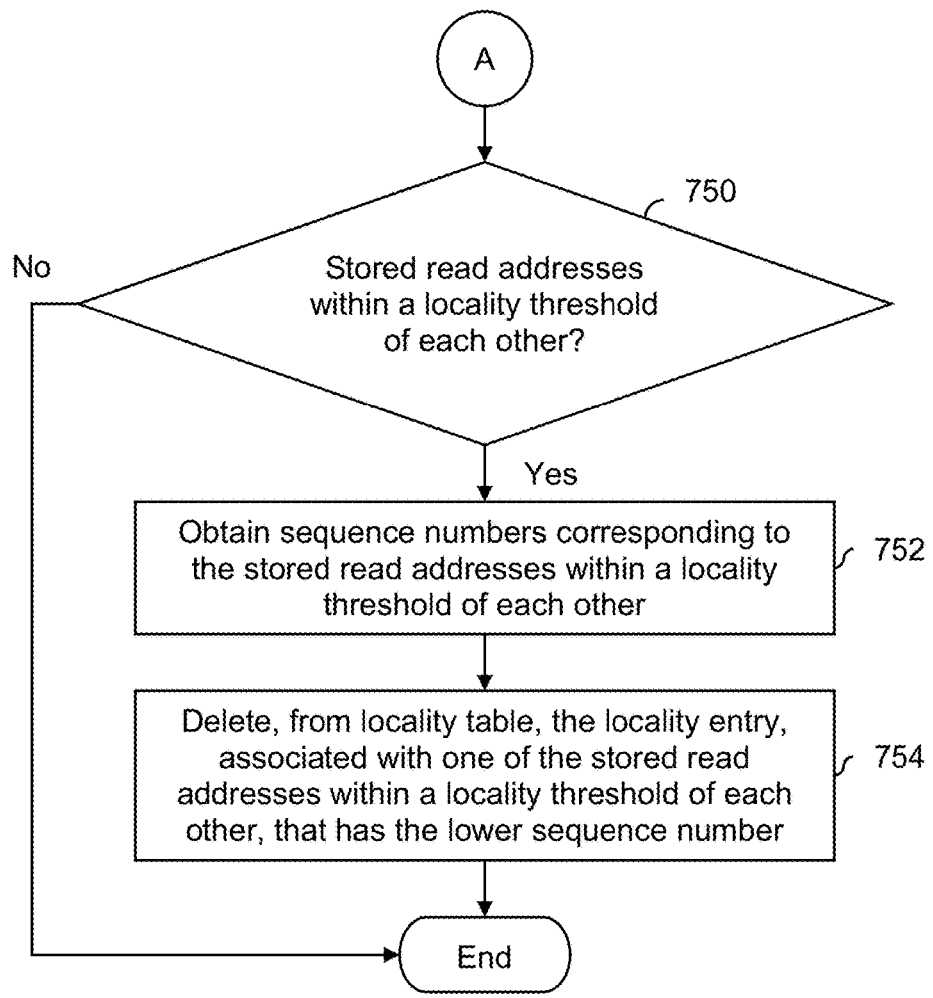

FIGS. 7A and 7B are a flowchart illustrating an embodiment of a locality tracking process. The process shown here is one example of a process that is performed by locality tracker 322 in FIG. 3.

At 700, a read address, a length, and a sequence number associated with the read request are obtained. In this example, each read request from the host includes a read address (such as a logical block address), a length (e.g., an amount of data to read, beginning from the read address), and a sequence number.

At 702, a minimum distance between the read address associated with the read request and a plurality of stored read addresses is determined. For example, a locality tracker may store a locality table with an entry for each locality currently identified. Each entry in the table may include a locality identifier, a read address (e.g., the last read address received for that particular locality), a maximum length (e.g., the largest length requested for that particular locality), and a sequence number (e.g., the last sequence number for that particular locality). Step 702 may include determining distances between the read address associated with the host read and all of the read addresses stored in the locality table, and then selecting the distance that is the smallest.

At 704, it is determined if the minimum distance is less than or equal to a locality threshold. In one example, a locality threshold is a configurable value that is used to decide whether two read addresses belong to the same group or locality (or not). If the minimum distance is less than the locality threshold at step 704, then the host read falls within one of the already-stored localities. As such, the locality entry corresponding to the stored read address from which the minimum distance was determined is updated at 706. In one example, the read address is updated with the new read address, the sequence number is updated with the new sequence number, and the maximum length is updated if the length associated with the read request is greater than the length stored in the locality table.

If the minimum distance is greater than the locality threshold at step 704, then the host read is associated with a new locality for which information is not currently stored in the locality table. The process then checks at 708 if the number of localities (e.g., currently, that is, before the creation of a new locality entry) is less than a maximum number of localities. In other words, the process checks to see if one of the localities needs to be deleted (because a maximum number of localities is already stored in the locality table) in order to make room for the new locality entry. If not (i.e., the maximum number of localities is already stored in the locality table), a locality entry having a smallest sequence number is evicted at 710. To put it another way, the oldest locality entry is removed.

After eviction at 710, or if the number of localities is less than the maximum number of localities, a new locality entry is created using the read address, the length, and the sequence number. For example, the new entry may be populated with the information obtained at step 700.

Once an existing locality entry is updated (e.g., via step 706) or a new locality entry is created (e.g., via step 712), the process checks to see if any localities should be merged together. At 750, it is determined if there are any stored read addresses within a locality threshold of each other. To put it another way, if the locality threshold is conceptually thought of as a window having a certain width, do two (or more) stored read addresses fall into the window at the same time?

If so, sequence numbers corresponding to the stored read addresses within a locality threshold of each other are obtained at 752. For example, the appropriate locality entries in the locality table would be accessed and the sequence numbers would be obtained from those entries.

At 754, the locality entry, associated with one of the stored read addresses within a locality threshold of each other, and that has the lower sequence number, is deleted from the locality table. To put it another way, the older locality is deleted, thus "merging" the two localities together.

In some embodiments, a locality tracker tracks state information and the time of a last state transition and stores this information in a locality table for each locality. For example, the states (sometimes referred to as read states) may consist of: sequential, stride, or random, which is a characterization of the types of reads associated with a given locality. In FIG. 2, for example, a locality tracker may determine that locality 1 (252) is in a sequential read state and locality 2 (254) is in a random read state. Any appropriate pattern analysis technique may be used.

In some such embodiments, a read address predictor uses the state information and the maximum length for a given locality to generate both a predicted read address and a predicted length (e.g., to prefetch beginning from the predicted read address) for that locality. Any appropriate pattern identification technique may be employed to select or otherwise determine the state a locality is in. In some embodiments, the time at which a locality last changed states is a sequence number (e.g., the sequence number of the host read which caused the locality to change from one state to another). Using sequence numbers may be desirable because they are already available in the prefetch path and it eliminates the need for a clock or counter.

One benefit to the technique described herein is that it permits relatively simple read address predictors to be used. Other prefetch techniques may need to use more complicated predictors in order to achieve desired performance metrics, but using localities and performance monitors puts less pressure on the read address prediction (e.g., because the suggested prefetch will not be permitted if the performance is not good). As such, simpler read address predictors are able to be used.

In some embodiments, a read address predictor outputs a predicted read address corresponding to the next read address (e.g., not fetched using read address and the length included in the read request from the host). In some such embodiments, the predicted length is set to the length of the stored maximum length for that locality. As described above, performing prefetch with localities and performance monitoring permits simpler read address predictors to be used, such as the one described above.

In some embodiments, a read address predictor uses the stored state for a given locality in generating a predicted read address, in particular when the locality is in a sequential read state or a stride read state. In some such embodiments, the predicted read address is set to the next read address (e.g., not fetched using read address and the length included in the read request from the host) if the locality is in a sequential read state. In some embodiments, the predicted read address is set to the next stride or "jump" if that locality is in a stride read state. In some embodiments, the predicted length is set to the maximum length stored for that locality.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a locality tracker configured to identify a locality associated with a read request based at least in part on a read address included in the read request;
   a read address predictor configured to generate a predicted read address based at least in part on the locality;
   a performance monitor configured to decide whether to permit the predicted read address to be prefetched;
   a storage interface configured to: in the event it is decided to permit the predicted read address to be prefetched, prefetch data from the predicted read address; and
   a prefetch cache configured to: in the event it is decided to permit the predicted read address to be prefetched, store the prefetched data.

2. The system recited in claim 1, wherein the system includes a semiconductor device, including one or more of the following: an application-specific integrated circuit (ASIC) or a field-programmable gate array (FPGA).

3. The system recited in claim 1, wherein the performance monitor is configured to decide whether to permit the predicted read address to be prefetched, including by:
   determining a utilization metric representative of a degree to which storage is being accessed; and
   determining whether the utilization metric is less than a utilization threshold, wherein in the event it is determined that the utilization metric is greater than the utilization threshold, data is not prefetched from the predicted read address.

4. The system recited in claim 1, wherein the performance monitor is configured to decide whether to permit the predicted read address to be prefetched, including by:
   determining a hit rate metric representative of a degree to which one or more previous predicted read addresses have been correctly predicted for the locality; and
   determining whether the hit rate metric is greater than a hit rate threshold, wherein in the event it is determined that the hit rate metric is less than the hit rate threshold, data is not prefetched from the predicted read address.

5. The system recited in claim 1, wherein the performance monitor is configured to decide whether to permit the predicted read address to be prefetched, including by:
   determining a read amplification metric representative of a degree to which one or more previous prefetches for the locality have contributed to read congestion; and
   determining whether the read amplification metric is less than a read amplification threshold, wherein in the event it is determined that the read amplification metric is greater than the read amplification threshold, data is not prefetched from the predicted read address.

6. The system recited in claim 1, wherein the performance monitor is configured to decide whether to permit the predicted read address to be prefetched, including by:
   determining a utilization metric representative of a degree to which storage is being accessed;
   determining a hit rate metric representative of a degree to which one or more previous predicted read addresses have been correctly predicted for the locality;
   determining a read amplification metric representative of a degree to which one or more previous prefetches for the locality have contributed to read congestion; and
   determining if (1) the utilization metric is less than a utilization threshold, (2) the hit rate metric is greater than a hit rate threshold, and (3) the read amplification metric is less than a read amplification threshold, wherein:
     in the event it is determined that (1) the utilization metric is less than the utilization threshold, (2) the hit rate metric is greater than the hit rate threshold, and (3) the read amplification metric is less than the read amplification threshold, data is prefetched from the predicted read address; and
     in the event it is determined that (1) the utilization metric is greater than the utilization threshold, (2) the hit rate metric is less than the hit rate threshold, or (3) the read amplification metric is greater than the read amplification threshold, data is prefetched from the predicted read address.

7. The system recited in claim 1, wherein:
   there are a plurality of localities;
   the prefetch cache is divided up into a plurality of portions, wherein each portion in the plurality of portions corresponds to a locality in the plurality of localities; and
   the system further includes a cache manager configured to:

determine if the portion of the prefetch cache corresponding to the locality, associated with a read request, is full; and in the event it is determined that the portion of the prefetch cache corresponding to the locality is full:
evict an oldest piece of data in the portion of the prefetch cache corresponding to the locality; and
store the prefetched data in the portion of the prefetch cache corresponding to the locality.

8. The system recited in claim 1, wherein the locality tracker is further configured to:
obtain a read address, a length, and a sequence number associated with the read request;
determine a minimum distance between the read address associated with the read request and a plurality of stored read addresses;
determine if the minimum distance is less than a locality threshold;
in the event it is determined that the minimum distance is less than the locality threshold, update a locality entry corresponding to a stored read address from which the minimum distance was determined; and
in the event it is determined that the minimum distance is greater than the locality threshold:
determine if a number of localities is less than a maximum number of localities;
in the event it is determined that the number of localities is greater than the maximum number of localities, evict a locality entry having a smallest sequence number; and
create a new locality entry using the read address, the length, and the sequence number.

9. A method, comprising:
identifying a locality associated with a read request based at least in part on a read address included in the read request;
generating a predicted read address based at least in part on the locality;
using a processor to decide whether to permit the predicted read address to be prefetched; and
in the event it is decided to permit the predicted read address to be prefetched:
prefetching data from the predicted read address; and
storing the prefetched data in a prefetch cache.

10. The method recited in claim 9, wherein the method is performed by a semiconductor device, including one or more of the following: an application-specific integrated circuit (ASIC) or a field-programmable gate array (FPGA).

11. The method recited in claim 9, wherein deciding whether to permit the predicted read address to be prefetched includes:
determining a utilization metric representative of a degree to which storage is being accessed; and
determining whether the utilization metric is less than a utilization threshold, wherein in the event it is determined that the utilization metric is greater than the utilization threshold, data is not prefetched from the predicted read address.

12. The method recited in claim 9, wherein deciding whether to permit the predicted read address to be prefetched includes:
determining a hit rate metric representative of a degree to which one or more previous predicted read addresses have been correctly predicted for the locality; and
determining whether the hit rate metric is greater than a hit rate threshold, wherein in the event it is determined that the hit rate metric is less than the hit rate threshold, data is not prefetched from the predicted read address.

13. The method recited in claim 9, wherein deciding whether to permit the predicted read address to be prefetched includes:
determining a read amplification metric representative of a degree to which one or more previous prefetches for the locality have contributed to read congestion; and
determining whether the read amplification metric is less than a read amplification threshold, wherein in the event it is determined that the read amplification metric is greater than the read amplification threshold, data is not prefetched from the predicted read address.

14. The method recited in claim 9, wherein deciding whether to permit the predicted read address to be prefetched includes:
determining a utilization metric representative of a degree to which storage is being accessed;
determining a hit rate metric representative of a degree to which one or more previous predicted read addresses have been correctly predicted for the locality;
determining a read amplification metric representative of a degree to which one or more previous prefetches for the locality have contributed to read congestion; and
determining if (1) the utilization metric is less than a utilization threshold, (2) the hit rate metric is greater than a hit rate threshold, and (3) the read amplification metric is less than a read amplification threshold, wherein:
in the event it is determined that (1) the utilization metric is less than the utilization threshold, (2) the hit rate metric is greater than the hit rate threshold, and (3) the read amplification metric is less than the read amplification threshold, data is prefetched from the predicted read address; and
in the event it is determined that (1) the utilization metric is greater than the utilization threshold, (2) the hit rate metric is less than the hit rate threshold, or (3) the read amplification metric is greater than the read amplification threshold, data is prefetched from the predicted read address.

15. The method recited in claim 9, wherein:
there are a plurality of localities;
the prefetch cache is divided up into a plurality of portions, wherein each portion in the plurality of portions corresponds to a locality in the plurality of localities; and
the method further includes:
using the processor to determine if the portion of the prefetch cache corresponding to the locality, associated with a read request, is full; and
in the event it is determined that the portion of the prefetch cache corresponding to the locality is full:
evicting an oldest piece of data in the portion of the prefetch cache corresponding to the locality; and
storing the prefetched data in the portion of the prefetch cache corresponding to the locality.

16. The method recited in claim 9 further comprising:
obtaining a read address, a length, and a sequence number associated with the read request;
determining a minimum distance between the read address associated with the read request and a plurality of stored read addresses;
determining if the minimum distance is less than a locality threshold;
in the event it is determined that the minimum distance is less than the locality threshold, updating a locality entry corresponding to a stored read address from which the minimum distance was determined; and in the event it is determined that the minimum distance is greater than the locality threshold:
  determining if a number of localities is less than a maximum number of localities;
  in the event it is determined that the number of localities is greater than the maximum number of localities, evicting a locality entry having a smallest sequence number; and
  creating a new locality entry using the read address, the length, and the sequence number.

17. A computer program product, the computer program product being embodied in a non-transitory computer readable storage medium and comprising computer instructions for:
  identifying a locality associated with a read request based at least in part on a read address included in the read request;
  generating a predicted read address based at least in part on the locality;
  deciding whether to permit the predicted read address to be prefetched; and
  in the event it is decided to permit the predicted read address to be prefetched:
    prefetching data from the predicted read address; and
    storing the prefetched data in a prefetch cache.

18. The computer program product recited in claim 17, wherein the computer instructions for deciding whether to permit the predicted read address to be prefetched include computer instructions for:
  determining a utilization metric representative of a degree to which storage is being accessed;
  determining a hit rate metric representative of a degree to which one or more previous predicted read addresses have been correctly predicted for the locality;
  determining a read amplification metric representative of a degree to which one or more previous prefetches for the locality have contributed to read congestion; and
  determining if (1) the utilization metric is less than a utilization threshold, (2) the hit rate metric is greater than a hit rate threshold, and (3) the read amplification metric is less than a read amplification threshold, wherein:
    in the event it is determined that (1) the utilization metric is less than the utilization threshold, (2) the hit rate metric is greater than the hit rate threshold, and (3) the read amplification metric is less than the read amplification threshold, data is prefetched from the predicted read address; and
    in the event it is determined that (1) the utilization metric is greater than the utilization threshold, (2) the hit rate metric is less than the hit rate threshold, or (3) the read amplification metric is greater than the read amplification threshold, data is prefetched from the predicted read address.

19. The computer program product recited in claim 17, wherein:
  there are a plurality of localities;
  the prefetch cache is divided up into a plurality of portions, wherein each portion in the plurality of portions corresponds to a locality in the plurality of localities; and
  the computer program product further includes computer instructions for:
    determining if the portion of the prefetch cache corresponding to the locality, associated with a read request, is full; and
    in the event it is determined that the portion of the prefetch cache corresponding to the locality is full:
      evicting an oldest piece of data in the portion of the prefetch cache corresponding to the locality; and
      storing the prefetched data in the portion of the prefetch cache corresponding to the locality.

20. The computer program product recited in claim 17 further comprising computer instructions for:
  obtaining a read address, a length, and a sequence number associated with the read request;
  determining a minimum distance between the read address associated with the read request and a plurality of stored read addresses;
  determining if the minimum distance is less than a locality threshold;
  in the event it is determined that the minimum distance is less than the locality threshold, updating a locality entry corresponding to a stored read address from which the minimum distance was determined; and
  in the event it is determined that the minimum distance is greater than the locality threshold:
    determining if a number of localities is less than a maximum number of localities;
    in the event it is determined that the number of localities is greater than the maximum number of localities, evicting a locality entry having a smallest sequence number; and
    creating a new locality entry using the read address, the length, and the sequence number.

* * * * *